United States Patent
Popp et al.

(10) Patent No.: US 10,525,426 B2
(45) Date of Patent: Jan. 7, 2020

(54) GAS DISTRIBUTOR FOR A SIEMENS REACTOR

(71) Applicant: Wacker Chemie AG, Munich (DE)

(72) Inventors: Friedrich Popp, Ooltewah, TN (US);
Christian Kutza, Burghausen (DE);
Martin Roeckl, Rosenheim (DE);
Tobias Weiss, Mehring (DE)

(73) Assignee: Wacker Chemie AG, Munich (DE)

( * ) Notice: Subject to any disclaimer, the term of this patent is extended or adjusted under 35 U.S.C. 154(b) by 24 days.

(21) Appl. No.: 14/782,855

(22) PCT Filed: Mar. 19, 2014

(86) PCT No.: PCT/EP2014/055472
§ 371 (c)(1),
(2) Date: Oct. 7, 2015

(87) PCT Pub. No.: WO2014/166711
PCT Pub. Date: Oct. 16, 2014

(65) Prior Publication Data
US 2016/0067663 A1     Mar. 10, 2016

(30) Foreign Application Priority Data

Apr. 9, 2013   (DE) .................. 10 2013 206 236

(51) Int. Cl.
*B01J 4/00*       (2006.01)
*B01J 19/00*     (2006.01)
(Continued)

(52) U.S. Cl.
CPC ............... *B01J 4/002* (2013.01); *B05B 1/207* (2013.01); *C01B 33/035* (2013.01)

(58) Field of Classification Search
CPC ...... B01J 4/00–002; B01J 19/00; B01J 19/24; B05B 1/00; B05B 1/207; B05B 1/14;
(Continued)

(56) References Cited

U.S. PATENT DOCUMENTS 3,188,173 A * 6/1965 Hughes et al. ............ B01J 8/44
422/143
3,796,420 A * 3/1974 Pearce ...................... C21C 5/48
266/222
(Continued)

FOREIGN PATENT DOCUMENTS

| CN | 101676203 A | 3/2010 |
| CN | 102424387 A | 4/2012 |

(Continued)

OTHER PUBLICATIONS

Machine translation of CN102424387 A, provided with IDS filed Aug. 11, 2016 and published Apr. 25, 2012.*

*Primary Examiner* — Natasha E Young
(74) *Attorney, Agent, or Firm* — Brooks Kushman P.C.

(57) ABSTRACT

A gas distribution system for a polysilicon deposition reactor eliminates or mitigates the problems associated with prior art distribution systems employs at least two segments which are gas-tightly connected to one another by readily detachable fasteners, with at least one gas inlet opening and one gas outlet opening, the gas distributor of the system being mounted by readily detachable fasteners to the polysilicon reactor.

16 Claims, 4 Drawing Sheets

(51) Int. Cl.
*B01J 19/24* (2006.01)
*B05B 1/00* (2006.01)
*B05B 1/14* (2006.01)
*B05B 1/20* (2006.01)
*C01B 33/00* (2006.01)
*C01B 33/02* (2006.01)
*C01B 33/021* (2006.01)
*C01B 33/027* (2006.01)
*C01B 33/035* (2006.01)

(58) Field of Classification Search
CPC ... B05B 1/20; B05B 1/205; C01B 33/00–021; C01B 33/027; C01B 33/035
See application file for complete search history.

(56) References Cited

U.S. PATENT DOCUMENTS

| | | | |
|---|---|---|---|
| 4,805,556 A | 2/1989 | Hagan et al. | |
| 2008/0056979 A1 | 3/2008 | Arvidson et al. | |
| 2011/0052914 A1* | 3/2011 | Urushihara | C01B 33/035 428/392 |
| 2011/0058987 A1* | 3/2011 | Stocklinger | G01N 30/88 422/119 |
| 2011/0058988 A1* | 3/2011 | Stocklinger | C01B 33/035 422/129 |
| 2011/0129621 A1* | 6/2011 | Qin | C01B 33/035 427/585 |
| 2011/0158888 A1* | 6/2011 | Erk | B01J 8/1827 423/349 |
| 2011/0229638 A1* | 9/2011 | Qin | C01B 33/035 427/255.28 |
| 2011/0268892 A1* | 11/2011 | Oda | C01B 33/035 427/593 |
| 2011/0305604 A1 | 12/2011 | Stoecklinger | |

FOREIGN PATENT DOCUMENTS

| | | |
|---|---|---|
| DE | 10 2009 003 368 B3 | 3/2010 |
| DE | 10 2009 035 952 A1 | 2/2011 |
| FR | 2582540 A1 | 12/1986 |
| JP | 2006317 A2 | 1/1990 |
| JP | 2002241120 A2 | 8/2002 |
| WO | 94/22568 A1 | 10/1994 |

* cited by examiner

GAS DISTRIBUTOR FOR A SIEMENS REACTOR

CROSS REFERENCE TO RELATED APPLICATIONS

This application is the U.S. National Phase of PCT Appln. No. PCT/EP2014/055472 filed Mar. 19, 2014, which claims priority to German Application No. 10 2013 206 236.2 filed Apr. 9, 2013, the disclosures of which are incorporated in their entirety by reference herein.

BACKGROUND OF THE INVENTION

1. Field of the Invention

The invention relates to a gas distributor for a Siemens reactor for deposition of polycrystalline silicon, in particular a feed gas distributor and an off-gas collector.

2. Description of the Related Art

High-purity polycrystalline silicon (polysilicon) serves as a starting material for producing monocrystalline silicon for semiconductors by the Czochralski (CZ)—or zone melting (FZ)—method, and also for producing monocrystalline or multicrystalline silicon by various drawing and casting methods for producing solar cells for photovoltaics.

Polysilicon is usually produced by means of the Siemens process. In this process, a reaction gas comprising one or more silicon-containing components and optionally hydrogen is introduced into a reactor comprising substrates heated by direct passage of current, wherein silicon deposits in solid form onto the substrates. The silicon-containing components preferably used are silane ($SiH_4$), monochlorosilane ($SiH_3Cl$), dichlorosilane ($SiH_2Cl_2$), trichlorosilane ($SiHCl_3$), tetrachlorosilane ($SiCl_4$) or mixtures of these substances.

The Siemens process is usually carried out in a deposition reactor (also termed "Siemens reactor"). In the most common embodiment, the reactor comprises a metallic baseplate and a coolable bell which is seated on the baseplate in such a manner that a reaction space is formed in the interior of the bell. The baseplate is furnished with one or more gas inlet openings and one or more off-gas openings for the departing reaction gases, and also with holders with which the substrates are held within the reaction space and are supplied with electric power.

Each substrate consists mostly of two thin filament rods and a bridge which generally joins the adjacent rods at their free ends. Most frequently, the filament rods are made of monocrystalline or polycrystalline silicon; more rarely, metals or alloys or carbon are used. The filament rods plug vertically into the electrodes situated on the reactor base, via which electrodes the connection to the power supply is made. On the heated filament rods and the horizontal bridge, high-purity polysilicon deposits, as a result of which the diameter thereof increases with time. After the desired diameter is achieved, the process is terminated.

To produce polysilicon, routinely deposition reactors are used in which, in the lower part, what is termed the baseplate, the reaction gas is injected via nozzles. An introduction of the reaction gas in the upper part of the reactor by means of nozzles is, however, equally possible.

Likewise, off-gas that is formed is frequently removed from the reactor via one or more openings in the reactor base, but also via the reactor hood.

Since a uniform distribution of the feed gas is important for the uniform deposition on the rods, the gas is usually fed via a plurality of nozzles.

Such a distribution of the feed gas can be effected either by means of a multiplicity of individual feed gas lines each having direct connection to the individual feed gas nozzles, or via a gas distributor, e.g. a ring-type or a different type of gas distributor in the vicinity of the reactor usually beneath the reactor baseplate, having a plurality of connections for the individual feed gas nozzles.

In the prior art, some corresponding solutions are known.

US2011/0058988 A1 describes a reactor for producing polycrystalline silicon, having a reactor base which has a multiplicity of nozzles each having one nozzle entry opening and each having a nozzle outlet opening, which form a feed for a silicon-containing gas into the reactor interior, characterized in that one wall is shaped in such a manner that, together with an outer surface of the reactor base, it delimits a cavity which forms a distribution of the silicon-containing gas onto at least one part of the nozzles with which it communicates, wherein the wall is mounted gas-tightly on the reactor base in such a manner that at least one contact surface of the cavity with the outer surface of the reactor base is restricted to a true subregion of the outer surface of the reactor base.

US2011/0058988 A1 has the object of providing a reactor for producing polycrystalline silicon, the reactor base of which is constructed in such a manner that the distribution of the silicon-containing gas to the nozzles in the reactor base is space-saving, reliable and inexpensive, and a ready accessibility to the further devices on the outside of the reactor base, e.g. electrodes or coolant connections, is permitted.

US2011/0305604 A1 describes a reactor for producing polycrystalline silicon by the monosilane process, having a reactor base which a multiplicity of nozzles has formed, through which a silicon-containing gas flows in, a plurality of filament rods likewise mounted on the reactor base and a gas outlet opening at a distance from the nozzles for feeding used monosilane to an enrichment and/or reprocessing, characterized in that the gas outlet opening is formed on a free end of an inner tube and in that the inner tube is guided through the reactor base, and in that the inner tube possesses an outer wall and an inner wall and thereby forms an intermediate space in which at least one cooling water circuit is guided. US2011/0305604 A1 has the object of designing a reactor for producing polycrystalline silicon in such a manner that the removal of used silicon-containing gas (monosilane: $SiH_4$) is designed in such a manner that reliable production of the polycrystalline silicon is ensured.

In a preferred embodiment, the reactor and the reactor base are constructed as a jacket comprising an inner wall and an outer wall, wherein the water for cooling is situated in the jacket. In this case, the reactor base comprises a first region and a second region, wherein the first region is formed by a reactor interior-facing plate of an intermediate plate which carries the nozzles, and wherein the second region is formed by the intermediate plate and a baseplate which carries the supply connections for the filaments.

The reactor has a multiplicity of nozzles for feeding the reaction gas. Via an intermediate plate, the reactor base is subdivided into two regions. The nozzles are constructed as a cylindrical connection between the intermediate plate and the interior of the reactor. Therefore, the region beneath the intermediate plate functions as a gas distributor.

U.S. Pat. No. 4,805,556 A describes a reactor for deposition of polycrystalline silicon by pyrolysis of a silane, which provides reprocessing off-gas from the reactor and at least in part returning it to the reactor. For this purpose, a ring-type distributor grid of a distributor piece and a multiplicity of distributor rings which correspond in number to the filaments are provided.

In a preferred embodiment, the distributor grid comprises two distributor pieces, wherein a first distributor piece is connected to a tube for reprocessed off-gas, and the second distributor piece is connected to the distributor rings, wherein the two distributor pieces are connected by means of at least one feed line. Each distributor ring comprises a multiplicity of nozzle openings which are arranged symmetrically. The distributor rings are placed in each case in such a manner that the reprocessed off-gas is directed towards a filament-carrying electrode.

Because the feed gases and off-gases are moisture-sensitive, and in the event of mixing with air or oxygen, formation of explosive gas mixtures can occur, feed gas lines and off-gas lines or distributors are firmly welded to the reactor base, cf. US2011/0058988 A1. This prevents escape of the reaction gas and simplifies certain maintenance work (e.g. no monitoring and no replacement of seals is necessary).

Through the deposition process, crack formation can occur in the growing silicon rods. As a consequence thereof, silicon fragments of various size can fall into feed openings and off-gas openings and block the gas lines or gas distributors.

In the worst case, all rods can disintegrate, wherein very large silicon pieces can fall into the inlet and outlet openings.

In the case of the feed gas, such a blockage leads to an uneven distribution or incorrect metering of the feed gas, and in the case of the off-gas, blockage can cause an undesirable pressure rise in the reactor.

For this reason, the silicon pieces must be removed at the latest before the following batch.

In the case of a gas distributor which is firmly connected to the reactor base, i.e. which can only be separated from the reactor base for example via cutting, in practice there is only the possibility of removing the silicon pieces in the batch change via the gas openings in the reactor.

Silicon pieces may usually be removed only with substantial effort (e.g. by hand or using a gripping tool or vacuum cleaner). This procedure is laborious and time consuming (i.e. relatively long set-up times) and also does not always lead to success, since very large pieces are sometimes too bulky for the gripping tool and cannot be removed by suction using the vacuum cleaner.

In a gas distributor or off-gas collector which is fastened to the reactor with the aid of detachable connections (e.g. a flange) via the feed-gas or off-gas outflow lines, although the feed-gas or off-gas lines can in fact be separated, the gas distributor or off-gas collector per se, in which most of the silicon pieces are found, cannot be opened. Additional piping and electrical connections beneath the reactor base, moreover, prevent simple access to the gas distributor and/or off-gas collector.

From these problems, there resulted the objective of the invention.

SUMMARY OF THE INVENTION

It has now been surprisingly and unexpectedly discovered that a gas distribution system for a polysilicon deposition reactor can be provided which eliminates or mitigates the problems associated with prior art distribution systems. This gas distribution system employs at least two segments which are gas-tightly connected to one another by readily detachable fasteners, with at least one gas inlet opening and one gas outlet opening, the gas distributor of the system being mounted by readily detachable fasteners to the polysilicon reactor.

DETAILED DESCRIPTION OF THE PREFERRED EMBODIMENTS

Figure 1:
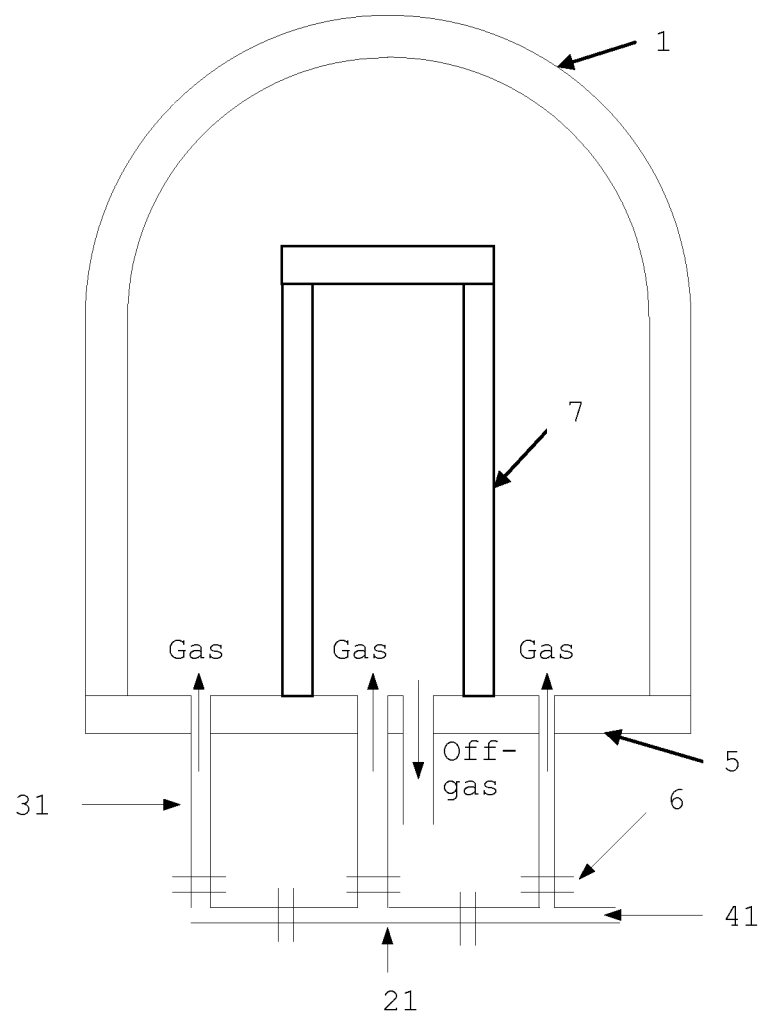
FIG. 1 shows schematically a Siemens reactor with a feed gas distributor.

The object is achieved by a gas distributor in one embodiment in which gases can be transported, comprising at least two segments which are gas-tightly connected to one another by means of readily detachable fastenings, at least one gas inlet opening and at least one gas outlet opening, wherein the gas distributor can be mounted by means of readily detachable fastening means to a reactor for deposition of polycrystalline silicon, wherein the at least one gas outlet opening of the gas distributor is communicatingly connected to one gas inlet opening of the reactor, and/or wherein the at least one gas inlet opening of the gas distributor is communicatingly connected to one gas outlet opening of the reactor.

Preferably, the gas distributor is a feed gas distributor which is suitable for introducing reactant gas (silanes) into the reactor. In this case, the at least one gas inlet opening is provided for the feed of reactant gas into the gas distributor and for this purpose is connected to a reactant gas feed line. The at least one gas outlet opening serves in this case for feeding reactant gas to the reactor nozzles and for this purpose is communicatingly connected to a gas inlet opening of the reactor. If the reactor has, for example, three gas inlet openings, the feed gas distributor likewise contains three gas outlet openings, of which each is in each case communicatingly connected to one of the gas inlet openings of the reactor.

However, there is also the possibility that a plurality of feed gas distributors are used for a multiplicity of gas inlet openings. Likewise, there is the possibility to combine the gas inlet openings with any desired expedient number of feed gas distributors and any desired expedient reactant gas feed lines.

The object of the invention is also achieved by a second embodiment of a gas distributor in which gas can be transported, comprising at least two segments which are gas-tightly connected to one another by means of readily detachable fastening means, at least one gas inlet opening and at least one gas outlet opening, wherein the gas distributor can be mounted by means of readily detachable fastening means to a reactor for deposition of polycrystalline silicon, wherein the at least one gas inlet opening of the gas distributor is provided for the feeding of off-gas from the reactor and is connected to at least one off-gas opening of the reactor, wherein the at least one gas outlet opening of the gas distributor serves for removing the off-gas from the gas distributor.

In this case, the at least one gas inlet opening of the gas distributor is provided for feeding off-gas from the reactor and for this purpose is communicatingly connected to a gas outlet opening (off-gas opening) of the reactor. If the reactor has, for example, three off-gas openings, the off-gas collector likewise contains three gas inlet openings, each of which are communicatingly connected to one of the off-gas openings of the reactor. The at least one gas outlet opening of the off-gas collector serves for removing the off-gas from the off-gas collector. However, there is also the possibility that a plurality of off-gas collectors are used for a multiplicity of off-gas openings. Likewise, there is the possibility to combine the gas outlet openings with any desired expedient number of off-gas collectors and individual off-gas lines.

The invention also relates to a reactor for deposition of polycrystalline silicon, which comprises at least one such feed gas distributor and/or at least one such off-gas collector (see FIGS. 1-4).

Figure 3:
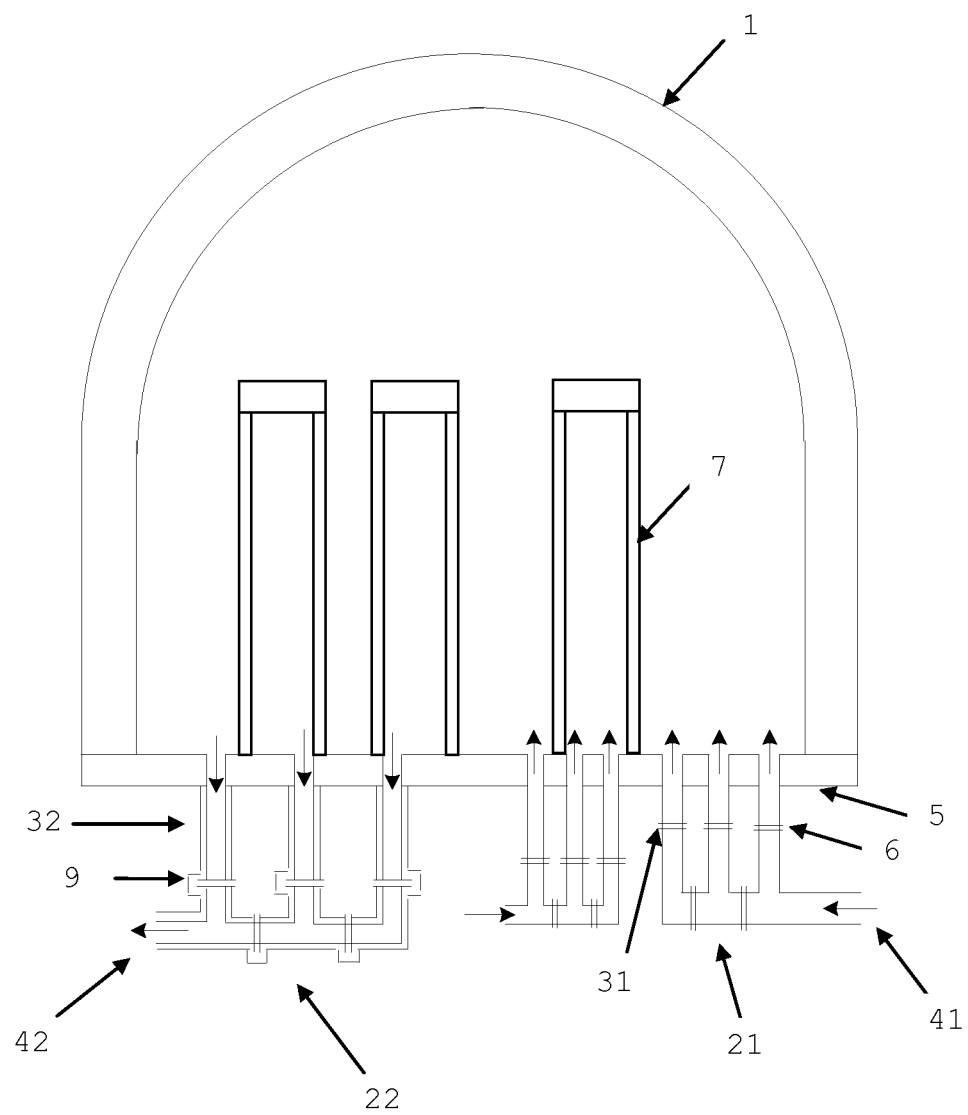
FIG. 3 shows schematically a Siemens reactor with an off-gas collector and two feed gas distributors.

It is preferred to provide a plurality of such off-gas collectors and/or feed-gas distributors in one deposition reactor (see, for example, FIGS. 3/4).

Preferably, the feed-gas distributor or off-gas collector is of a ring type distributor. Ring-type feed-gas distributors or off-gas collectors exhibit, in particular, the advantage of a space-saving arrangement on the reactor and give rise to a uniform gas flow and thereby to a uniform gas distribution in the reactor space.

Particular preference is given to feed gas distributors which are arranged in such a manner that the feed lines from the gas distributor to the nozzles have an identical shape and length for all nozzles, in the ideal case—if the feed line is to proceed from the bottom via the baseplate into the reactor—can even be connected vertically upwards.

The feed line is taken to mean the connection from the gas distributor to the individual reactor nozzles.

Uniform removal of the off-gas from the reactor is of equal importance for uniform gas distribution in the reactor space. This removal can be effected in a similar manner to the feed gas distributor via an off-gas collector.

Particular preference is given to off-gas collectors which are arranged in such a manner that the off-gas removal lines from the reactor off-gas openings to the off-gas collector have identical shape and length.

The off-gas removal lines are taken to mean the connection between reactor off-gas opening and off-gas collector.

It is essential for the success of the invention that gas distributors and off-gas collectors are composed of two or more part pieces.

All part pieces are connected gas-tightly to one another only using detachable means (e.g. flanges).

The dividable segments are connected gas-tightly to one another only using detachable fastening means (e.g. flanges with bolts, flanges with clamps, threaded fastenings, compression fittings, etc.).

In addition, the feed lines or off-gas removal lines should likewise be connected gas-tightly to the reactor using detachable means (e.g. flanges).

The device according to the invention permits the Si pieces that have fallen in to be removed via the simplified removal and cleaning of the gas distributor or off-gas collector.

Because the gas distributor or off-gas collector consists of a plurality of segments, it is also possible, if required, to demount only the contaminated part of the distributor/collector and clean it (saving of set-up time) or optionally replace it.

It is possible in many cases to dispense with ejecting the pieces at high pressure.

Furthermore, the service life of the facility is not increased by laborious working steps with the auxiliary means (gripping arm, vacuum cleaner, etc.).

In the event that baseplates, for maintenance work beneath the facility, need not be entirely demounted (e.g. using reactor pits beneath the facilities), a single segment of the gas distributor/off-gas collector can be relatively rapidly removed and cleaned.

In the case of gas distributors or off-gas collectors which are arranged in such a manner that the feed lines/off-gas removal lines thereof are geometrically identical and in the ideal case their piping can even be connected perpendicularly upward/downward (i.e. without bends in the feed lines/off-gas removal lines), in addition a uniform gas flow forms in the reactor which improves the deposition process.

The invention will be additionally described hereinafter with reference to FIGS. 1, 2, 3 and 4.

LIST OF REFERENCE SIGNS USED

1 Reactor hood
21 Feed gas distributor
22 Off-gas collector
31 Feed gas line
32 Off-gas line
41 Reactant gas feed
42 Off-gas removal
5 Baseplate
6 Flange connection
7 U-shaped substrate (filament)
8 Water cooling (double-wall)
9 Water spray FIG. 1 shows a reactor having a reactor hood 1, a U-shaped substrate 7 (on which silicon is deposited) and a feed gas distributor 21. 31 shows the feed gas line. Reactant gas is guided via reactant gas feed 41 into the feed gas distributor 21. Three openings for reactant gas are shown. Corresponding openings are present in the baseplate 5. The individual elements of the feed gas distributor are fastened and may be separated by means of flange connections 6. Off-gas is removed via an opening in the baseplate 5.

Figure 2:
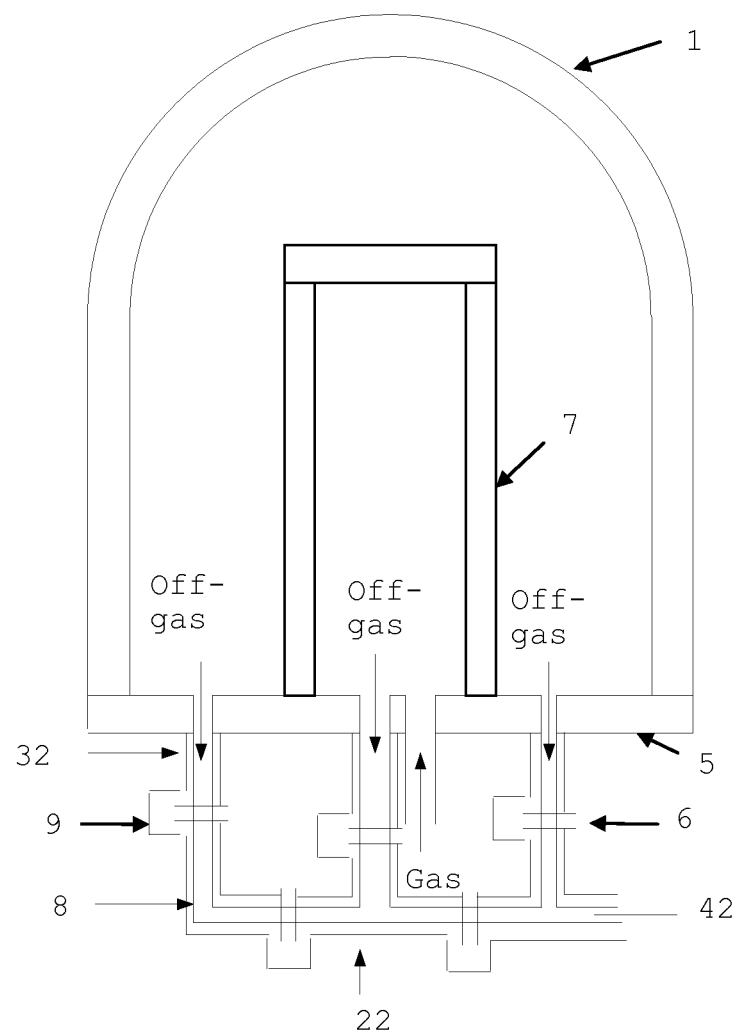
FIG. 2 shows a Siemens reactor with an off-gas collector.

FIG. 2 shows a reactor having a reactor hood 1, a U-shaped substrate 7 (on which silicon is deposited) and an off-gas collector 22. 32 shows the off-gas line. Off-gas from the reactor is conducted via three openings in the baseplate 5 into off-gas lines 32 (off-gas collector has corresponding openings) and removed by means of off-gas removal 42 from the off-gas collector 22. The individual elements of the off-gas collector 22 are fastened and may be separated by means of flange connections 6. Water cooling 8 is provided, with water spray 9.

FIG. 3 shows a reactor having a reactor hood 1, a U-shaped substrate 7 (on which silicon is deposited) and two feed gas distributors 21. 31 shows the feed gas line. Reactant gas is conducted via reactant gas feed 41 into the feed gas distributor 21. Per feed gas distributor 21 three openings for reactant gas are shown. Corresponding openings are present in the baseplate 5. The individual elements of the feed gas distributor are fastened and may be separated by means of flange connections 6. In addition an off-gas collector 22 is provided. 32 shows the off-gas line. Off-gas from the reactor is conducted via three openings in the baseplate 5 into off-gas lines 32 (off-gas collector has corresponding openings) and is removed from the off-gas collector 22 by means of off-gas removal 42. The individual elements of the off-gas collector 22 are fastened and may be separated by means of flange connections 6. Water cooling 8 is provided, with water spray 9.

Figure 4:
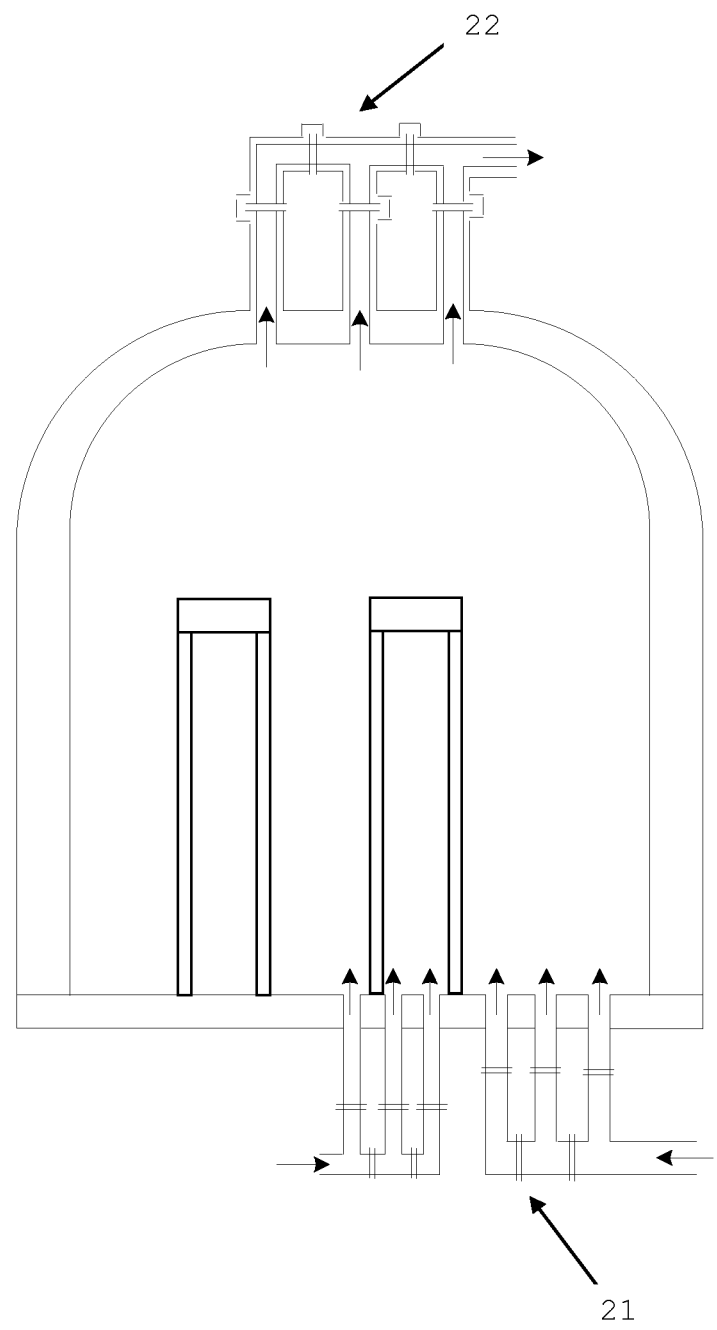
FIG. 4 shows schematically a Siemens reactor having an off-gas collector on the reactor lid and two feed gas distributors on the reactor base.

FIG. 4 shows an embodiment having two feed-gas distributors 21 and an off-gas collector 22, in which, however, in departure from FIG. 3 the off-gas collector is not flanged to the baseplate, but to the reactor lid.

The invention claimed is:

1. A reaction gas ring distributor positioned below and spaced apart from a baseplate of a Siemens reactor, the reaction gas ring distributor comprising a plurality of ring segments, the ring segments gas-tightly connected to each other at ends thereof by detachable fasteners to form the ring of the reaction gas ring distributor, the reaction gas ring distributor having at least one reaction gas inlet opening and at least three reaction gas outlet openings, at least three ring segments each having one reaction gas outlet opening, each of the at least three reaction gas outlet openings individually gas-tightly connected by a detachable fastener to a single reaction gas inlet of the baseplate of the Siemens reactor, such that reaction gas for operation of the reactor can be fed to the reaction gas ring distributor inlet opening and from there to the reactor through the at least three reaction gas outlet openings.

2. The reaction gas ring distributor of claim 1, wherein each ring segment has a reaction gas outlet, each individual reaction gas outlet gas-tightly connected by a detachable fastener to a single reaction gas inlet of a plurality of reaction gas inlets of the Siemens reactor.

3. The reaction gas ring distributor of claim 1, wherein the detachable fasteners comprise flange connectors.

4. The reaction gas ring distributor of claim 1, wherein the reaction gas outlets from the reaction gas ring distributor are oriented in a vertical direction.

5. The reaction gas ring distributor of claim 4, where the reaction gas outlets of the reaction gas ring gas distributor are attached by detachable fasteners to vertical gas inlets, each gas inlet communicating with a single one of a plurality of gas nozzles of the Siemens reactor, such that reaction gas leaving the reaction ring gas distributor has a vertical path to the gas nozzles.

6. The ring gas distributor of claim 5, wherein the Siemens reactor has a plurality of reaction gas feed lines to the reactor for supplying reaction gas to the reactor, each feed line comprising a vertically extending gas outlet from the reaction ring gas distributor and a vertical gas inlet of the Siemens reactor connected by detachable fasteners, and wherein all feed lines are identical in shape.

7. An offgas ring collector positioned outside of a Siemens reactor and spaced apart therefrom, the offgas ring collector comprising a plurality of ring segments, the ring segments gas-tightly connected to each other by detachable fasteners at their ends to form the ring of the offgas ring collector, the offgas ring collector having at least one offgas outlet opening and at least three offgas inlet openings, at least three ring segments each having one offgas inlet opening, each of the at least three offgas inlet openings gas-tightly and individually connected to one of a plurality of offgas outlets of the Siemens reactor, such that offgas from operation of the Siemens reactor is fed to the offgas ring collector offgas inlet openings and from there to the offgas outlet opening.

8. The offgas ring collector of claim 7, wherein the detachable fasteners comprise flange connectors.

9. The offgas ring collector of claim 8, wherein offgas lines, each comprising an off-gas opening of the reactor and an inlet opening of the gas distributor, have an identical shape.

10. The offgas ring collector of claim 7, wherein offgas lines, each comprising an off-gas opening of the reactor and an inlet opening of the offgas ring collector, have an identical shape.

11. In a Siemens reactor having reaction gas inlets, the improvement comprising fastening a reaction gas ring distributor of claim 1 to the Siemens reactor below the base thereof to supply reaction gas to the reactor.

12. In a Siemens reactor having offgas outlets, a bell, and baseplate, the improvement comprising fastening a ring offgas collector of claim 7 to the Siemens reactor to remove offgas.

13. The Siemens reactor of claim 12, wherein the offgas ring collector is located below the baseplate of the reactor and spaced apart therefrom.

14. In a Siemens reactor having reaction gas inlets and offgas outlets and a baseplate, the improvement comprising:
providing a reaction gas ring distributor below the baseplate and spaced apart therefrom for supplying reaction gas, fastened to the reaction gas inlets by detachable fasteners, the reaction gas ring distributor comprising a plurality of ring segments, the reaction gas ring segments gas-tightly connected to each other at ends thereof by detachable fasteners, the reaction gas ring distributor having at least one reaction gas inlet opening and at least three reaction gas openings, at least three ring segments each having one reaction gas outlet opening, each of the at least three reaction gas outlet openings gas-tightly and individually connected to a single one of a plurality of reaction gas inlets of the baseplate of the Siemens reactor, such that reaction gas for operation of the reactor can be fed to the reaction gas ring distributor inlet opening and from there to the reactor through the at least three reaction gas outlet openings, and further comprising:
an offgas ring collector positioned outside the Siemens reactor, the offgas ring collector comprising a plurality of offgas ring segments, the offgas ring segments gas-tightly connected to each other by means of detachable fasteners at ends thereof to form the ring of the offgas ring collector, the offgas ring collector having at least one offgas outlet opening and at least three offgas inlet openings, at least three offgas ring segments each having one offgas inlet opening, each of the at least three offgas inlet openings individually gas-tightly connected to a single one of a plurality of gas outlets of the Siemens reactor, such that offgas from operation of the reactor can be fed to the offgas ring collector inlet openings and from there to the offgas outlet opening.

15. The Siemens reactor of claim 14, wherein both the reaction gas ring distributor and the offgas ring collector are located below the baseplate of the reactor.

16. The Siemens reactor of claim 14, wherein the reaction gas ring distributor is located below the baseplate of the reactor, and the offgas ring collector is located above the reactor.

* * * * *